United States Patent
Schulz et al.

[11] Patent Number: 6,093,494
[45] Date of Patent: Jul. 25, 2000

[54] ANTISTRIP LATEX FOR AGGREGATE TREATMENT

[75] Inventors: Gerald Owen Schulz, Stow, Ohio; Alan Lee Bethel, Roswell, Ga.

[73] Assignee: The Goodyear Tire & Rubber Company, Akron, Ohio

[21] Appl. No.: 09/103,592

[22] Filed: Jun. 24, 1998

Related U.S. Application Data

[60] Provisional application No. 60/051,141, Jun. 27, 1997.

[51] Int. Cl.$^7$ .......................... B32B 15/02; B32B 17/02; B32B 19/00; B32B 21/02; B32B 23/02

[52] U.S. Cl. ............................. 428/403; 524/8; 524/157; 524/423; 524/436

[58] Field of Search ................................. 428/403; 524/8, 524/436, 423, 157

[56] References Cited

U.S. PATENT DOCUMENTS

| | | | |
|---|---|---|---|
| 5,002,987 | 3/1991 | Schulz | 524/60 |
| 5,262,240 | 11/1993 | Dunning et al. | 428/404 |
| 5,534,568 | 7/1996 | Schulz et al. | 524/69 |

*Primary Examiner*—William Krynski
*Assistant Examiner*—B. Shewareged
*Attorney, Agent, or Firm*—Alvin T Rockhill

[57] ABSTRACT

The subject invention relates to a process for coating aggregate which is particularly useful in making asphalt concrete to provide the aggregate with a high level of resistance to stripping by water, which comprises: (1) mixing the aggregate with latex to form a latex/aggregate mixture, wherein said latex is comprised of water, an emulsifier, a polymer and a water-soluble divalent metal salt; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

81 Claims, No Drawings

ANTISTRIP LATEX FOR AGGREGATE TREATMENT

This application claims the benefit of U.S. Provisional Application 60/051,141 filed Jun. 27, 1997.

BACKGROUND OF THE INVENTION

The importance of good roads and highways has been appreciated since the time of the Roman Empire. By about 300 B.C., the first section of the Appian Way extending from Rome to Capua was built. Some of the more than 50,000 miles of roadway ultimately built in the Roman Empire was constructed with heavy stone. However, not much progress was made in the art of road construction from the era of the Roman Empire until the development of the motor vehicles, such as automobiles and trucks.

For centuries, stone blocks, wood blocks, vitrified brick and natural asphalt (bitumen) have been used to pave roads and highways. However, at the beginning of the automobile era, most rural roadway surfacing consisted of broken stone or gravel. Such roads were often rough, dusty and clearly inadequate for modern automobile and truck traffic.

Today, the United States has the most extensive highway system in the world with about 2,000,000 miles of paved road. Napoleon realized the importance of roadway systems and built such a system in France which today has the second most extensive system of paved roadways in the world covering about 500,000 miles. Germany, Japan, Great Britain, India and Australia also currently have systems of paved roads which extend well over 100,000 miles. In addition to these public roadways, there are countless paved driveways and parking lots all over the world.

Today, roads, highways, driveways and parking lots are often paved with asphalt concrete. Pavement can be made with asphalt concretes which are dust-free, smooth and which offer the strength required for modern automobile and heavy truck traffic. Asphalt concrete is generally made by mixing aggregate (sand and gravel or crushed stone) with the proper quantity of an asphalt cement at an elevated temperature. The hot asphalt concrete is then placed by a layering machine or paver on the surface being paved and thoroughly rolled before the asphalt concrete mixture cools. The asphalt concrete is normally applied at a thickness varying from about 25 to about 100 millimeters.

Asphalt concrete pavements can be made to be very smooth which offers outstanding frictional resistance for vehicles operating thereon. Such asphalt concrete pavement can also be repaired simply by adding additional hot asphalt concrete to holes and other types of defects which develop in the surface. Asphalt concrete pavements can also be upgraded easily by adding additional layers of hot asphalt concrete to old surfaces which are in need of repair.

Even though asphalt concrete offers numerous benefits as a paving material, its use is not trouble-free. One major problem encountered with asphalt concrete pavements is the loss of the adhesive bond between the aggregate surface and the asphalt cement. This breaking of the adhesive bond between the asphalt cement and the aggregate surface is known as "stripping." The stripping of asphalt binder from aggregate surfaces results in shorter pavement life and necessitates the implementation massive annual highway maintenance programs. Reduction of this stripping tendency is of great interest when trying to improve the condition of roads while lowering maintenance costs.

Over the years, various methods have been developed to reduce stripping tendencies. For instance, amines and lime are known to act as anti-stripping agents and are frequently applied to the surface of the aggregate prior to mixing it with the asphalt cement in making asphalt concrete. U.S. Pat. No. 5,219,901 discloses a technique for reducing stripping tendencies which involves coating the aggregate with a thin, continuous film of a water-insoluble high molecular weight organic polymer, such as an acrylic polymer or a styrene-acrylic polymer.

U.S. Pat. No. 5,262,240 discloses an excellent technique for providing aggregate with a high level of resistance to stripping by water, which comprises: (1) mixing the aggregate with latex to form a latex/aggregate mixture which is comprised of from about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

The technique disclosed by U.S. Pat. No. 5,262,240 can be used to treat most aggregates with excellent results. However, its use on some clay-bearing aggregates which undergo water absorption and can result in a loss of compressive strength and modulus. This, of course, results in the asphalt concrete made therewith having less desirable physical characteristics. Thus, the technique disclosed in U.S. Pat. No. 5,262,240 is not optimal for use on some clay-bearing aggregates. There is, accordingly, a current need for a better technique for coating aggregate with latex which does not result in reduced compressive strength and reduced modulus.

SUMMARY OF THE INVENTION

It has been unexpectedly found that rubber latex containing a water-soluble divalent metal salt acts as an excellent anti-strip agent when applied to the surface of aggregate and that the use of such aggregates does not result in water absorption and reduced compressive strength and modulus. In addition to providing excellent anti-strip characteristics, the use of such latices does not present environmental or safety hazards. In such applications, the latex is applied to the surface of the aggregate and dried prior to mixing the aggregate with the asphalt cement used in making asphalt concrete.

The present invention specifically discloses a process for coating aggregate which is particularly useful in making asphalt concrete to provide the aggregate with a high level of resistance to stripping by water, which comprises: (1) mixing the aggregate with latex to form a latex/aggregate mixture, wherein said latex is comprised of water, an emulsifier, a polymer and a water-soluble divalent metal salt; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

The subject invention also reveals a process for preparing asphalt concrete with comprises: (1) mixing the aggregate with latex to form a latex/aggregate mixture, wherein said latex is comprised of water, an emulsifier, a polymer and a water-soluble divalent metal salt; (2) heating the latex/ aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate; (4) mixing the coated aggregate with about 3 percent to about 8 percent asphalt based upon the total weight of the coated aggregate at a temperature of at least about 107° C.; and (5) continuing to mix the coated aggregate with the asphalt to attain an essentially homogeneous asphalt concrete.

The present invention further discloses a latex that is particularly useful for coating aggregate to improve resistance to stripping by water, said latex being comprised of water, an emulsifier, a rubbery polymer and from about 1 phr to about 50 phr of a water-soluble salt of a divalent metal.

DETAILED DESCRIPTION OF THE INVENTION

The latex utilized in coating aggregate in accordance with this invention is the latex of a polydiene rubber. Such polydiene rubbers are comprised of repeat units which are derived from at least one conjugated or nonconjugated diene monomer. Such diene monomers will typically be conjugated diene monomers which contain from about 4 to about 8 carbon atoms, such as 1,3-butadiene or isoprene. Such polydiene rubber can also include repeat units which are derived from other types of monomers which are copolymerizable with the diene monomers. For instance, vinyl aromatic monomers, such as styrene or α-methylstyrene, can be copolymerized with diene monomers to prepare rubber latices which are useful in the present invention. For instance, styrene-butadiene rubber (SBR) latex or nitrile rubber (NBR) latex can be employed. For economic reasons, it will typically be preferred to utilize a polybutadiene latex.

The polydiene rubber latex utilized in accordance with this invention can be synthesized using conventional emulsion polymerization techniques. Such emulsion polymerizations generally utilize a charge composition which is comprised of water, one or more diene monomers, optionally additional copolymerizable monomers, an initiator and an emulsifier (soap). Such polymerizations can be conducted over a very wide temperature range from about 0° C. to as high as about 100° C. Such emulsion polymerizations are typically conducted at a temperature which is within the range of about 5° C. to about 60° C.

The emulsifiers used in such polymerizations may be charged at the outset of the polymerization or may be added incrementally or proportionately as the reaction proceeds. Anionic, cationic or nonionic emulsifiers may be employed. However, sulfonate surfactants have been determined to be highly preferred. This is because hard water is frequently encountered "on site" at asphalt concrete plants. It has been determined that the use of sulfonate surfactants results in much better latices for utilization in such applications where hard water is encountered.

Some representative examples of preferred sulfonate surfactants include: alkane sulfonates, esters and salts, such as alkylchlorosulfonates with the general formula:

wherein R is an alkyl group having from 1 to 20 carbon atoms, and alkylsulfonates with the general formula:

wherein R is an alkyl group having from 1 to 20 carbon atoms; sulfonates with intermediate linkages such as ester and ester-linked sulfonates such as those having the formula:

and

wherein R is an alkyl group having from 1 to 20 carbon atoms such as dialkyl sulfosuccinates; ester salts with the general formula:

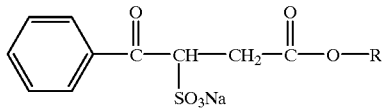

wherein R is an alkyl group having from 1 to 20 carbon atoms, alkarylsulfonates in which the alkyl groups contain preferably from 10 to 20 carbon atoms (e.g., dodecylbenzenesulfonates, such as sodium dodecylbenzenesulfonate) and alkyl phenol sulfonates.

Disulfonated surfactants having the structural formula:

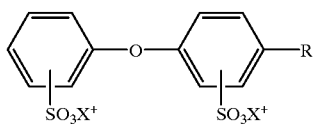

wherein R represents a linear or branched alkyl group containing from about 6 to about 16 carbon atoms and wherein X represents a metal ion, such as a sodium ion, have proven to be excellent surfactants for making the latex used in the practice of this invention. Such surfactants are sold by The Dow Chemical Company as Dowfax™ anionic surfactants.

The emulsion polymerizations used in synthesizing the polydiene rubber latices may be initiated using free radical catalysts, ultraviolet light or radiation. To insure a satisfactory polymerization rate, uniformity and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butylperoxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like.

The emulsion polymerization system used in the synthesis of the latex can be treated at the desired degree of conversion with shortstopping agents, such as hydroquinone. Typical stabilizing agents and standard antioxidants can also be added to the latex. A water-soluble divalent metal salt will also be added to the latex. The divalent metal salt will typically be a calcium or magnesium salt. Some representative examples of water-soluble divalent metal salts that can be utilized include calcium chloride, magnesium chloride and magnesium sulfate. The divalent metal salt will typically be added to the latex while the latex is being agitated.

Normally from about 1 phr to about 50 phr of the divalent metal salt will be added to the latex. It is typically preferred from the latex to contain from about 4 phr to about 30 phr of the divalent metal salt. It is normally more preferred for the latex to contain from about 5 phr to about 10 phr of the divalent metal salt.

It is normally desirable to reduce the pH of the latex to below about 9 prior to addition of the divalent metal salt to improve latex stability. This can be accomplished by adding an acid, such as sulfuric acid, to the latex. In many cases, it will be preferred to adjust the pH of the latex to below about 8 prior to addition of the divalent metal salt.

It is also frequently desirable to add polyethylene glycol to the latex to further improve stability and to further reduce the viscosity of the latex. Generally, from about 0.005 phr (parts per 100 parts by dry weight of rubber) to about 0.5 phr of the polyethylene glycol will be added for these purposes. It is typically preferred to add from about 0.01 phr to about 0.1 phr of polyethylene glycol to the latex. It is generally most preferred for the latex to contain from about 0.03 phr to about 0.07 phr of polyethylene glycol. The polyethylene glycol will normally have a molecular weight which is within the range of about 10,000 to about 40,000 with molecular weights within the range of about 15,000 to about 25,000 being most preferred.

Standard aggregate can be utilized in the practice of this invention. However, the latex for this invention will provide its greatest benefit in cases where clay-bearing aggregates are utilized. The aggregate is essentially a mixture containing rocks, stones, crushed stone, gravel and/or sand. The aggregate will typically have a wide distribution of particle sizes ranging from dust to golf ball size. The best particle size distribution varies from application to application. However, the use of diene rubber latices as anti-stripping agents in accordance with this invention is applicable to all aggregate particle size distributions.

The aggregate is coated with the polydiene rubber latex in the first step of carrying out the process of this invention. The latex used will typically have a solids content within the range of about 2 percent to about 45 percent (based on weight). It is more typical for the latex to have a solids content within the range of about 5 to about 30 weight percent with it generally being preferred for the latex to have a solids content which is within the range of about 10 weight percent to about 20 weight percent.

The latex can be simply sprayed onto the aggregate. It is, of course, also possible to coat the aggregate with the latex by slurrying it with the latex or by actually dipping it into the latex. The amount of latex applied will be sufficient for the latex/aggregate mixture to contain from about 0.005 weight percent to about 0.5 weight percent dry polymer, based upon the weight of the aggregate. It is preferred for the latex/aggregate mixture to contain from 0.01 to 0.2 weight percent polymer and is more preferred for it to contain from 0.05 to 0.1 weight percent polymer. In any case, after the latex is thoroughly applied to the aggregate, the aggregate will be dried to a moisture content which is below about 0.7 weight percent. This can be accomplished by heating the aggregate to an elevated temperature. The aggregate will typically be heated to a temperature which is within the range of about 150° F. (66° C.) to about 450° F. (232° C.). It is typically preferred to heat the aggregate to a temperature which is within the range of about 200° F. (93° C.) to 400° F. (204° C.). It is generally most preferred to heat the aggregate to a temperature which is within the range of about 300° F. (149° C.) to about 350° F. (177° C.). As the water in the latex evaporates, a polymer film forms and crosslinks on the surface of the aggregate to produce a coated aggregate surface.

The coated aggregate can be dried utilizing standard equipment which is used in plants which are designed to make asphalt concrete. For instance, the aggregate which has been coated with latex can be dried in a conventional drying drum or in a conventional drum mixer. After the aggregate has been dried, it is then mixed with an appropriate amount of asphalt cement. As a general rule, from about 3 weight percent to about 8 weight percent of the asphalt will be mixed with the coated aggregates, based upon the total weight of the coated aggregates. It is more typical for from about 5 weight percent to about 6 weight percent of the asphalt to be added to the coated aggregate, based upon the total weight of the coated aggregate.

Asphalt is defined by ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by ASTM as a class of black or dark-colored (solid, semi-solid or viscous) cementitious substances, natural or manufactured, composed principally of high molecular weight hydrocarbons, of which asphalts, tars, pitches and asphaltites are typical. ASTM further classifies asphalts or bituminous materials as solids, semi-solids or liquids using a penetration test for consistency or viscosity. In this classification, solid materials are those having a penetration at 25° C. under a load of 100 grams applied for 5 seconds, of not more than 10 decimillimeters (1 millimeter). Semi-solids are those having a penetration at 25° C. under a load of 100 grams applied for 5 seconds of more than 10 decimillimeters (1 millimeter) and a penetration at 25° C. under a load of 50 grams applied for 1 second of not more than 35 millimeters. Semi-solid and liquid asphalts predominate in commercial practice today.

Asphalts are usually specified in several grades for the same industry, differing in hardness and viscosity. Specifications of paving asphalt cements generally include five grades differing in either viscosity level at 60° C. or penetration level. Susceptibility of viscosity to temperatures is usually controlled in asphalt cement by its viscosity limits at a higher temperature such as 135° C. and a penetration or viscosity limit at a lower temperature such as 25° C. For asphalt cements, the newer viscosity grade designation is the mid-point of the viscosity range. Table I below shows the ASTM grading system for AC-2.5, AC-5, AC-10, AC-20 and AC-40.

The asphalt materials which may be used in the present invention are those typically used for road paving, repair and maintenance purposes. Petroleum asphalts are the most common source of asphalt cements. Petroleum asphalts are produced from the refining of petroleum and used predominantly in paving and roofing applications. Petroleum asphalts, compared to native asphalts, are organic with only trace amounts of inorganic materials. The asphalt cements that may be used in the present invention have an ASTM grade of AC-2.5, AC-5, AC-10, AC-20 and AC-40. The preferred asphalt cements include AC-5, AC-10 and AC-20 with AC-5 and AC-10 being the most preferred grades.

The coated aggregate is mixed with the asphalt to attain an essentially homogeneous asphalt concrete. The coated aggregate is mixed with the asphalt cement utilizing conventional techniques and standard equipment. For instance, the coated aggregate can be dried and mixed with asphalt to produce asphalt concrete on a continuous basis in a standard mixer.

The asphalt concrete made by the process of this invention can then be used to pave roads, highways, exit ramps, streets, driveways, parking lots, airport runways or airport taxiways utilizing conventional procedures. However, pavements made utilizing the asphalt concretes of this invention are far less susceptible to stripping than conventional asphalt concrete surfaces. Additionally, such asphalt concrete pavements are believed to be less susceptible to oxidative degradation. This is because the rubber coating on the aggregate prevents oxidative degradation of the asphalt which is normally catalyzed by the aggregate.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, a latex designed for coating clay-bearing aggregate was prepared. In the procedure used, 40 grams of Pliolite® 7528 SBR latex was added to a beaker which was equipped with stirring rod. The Pliolite® 7528 latex had a solids content of about 45 percent and the styrene-butadiene rubber therein contained about 20 percent bound styrene and had a Mooney viscosity of about 100. Then, the pH of the latex was adjusted from 10 to about 7.5 by adding 0.52 grams of a 5 percent aqueous solution of sulfuric acid to the latex. After the pH was adjusted, 1.2 grams of magnesium sulfate ($MgSO_4 \cdot 7H_2O$) was added with vigorous agitation being applied. The latex remained stable and no creaming was observed. The Brookfield viscosity (RV6) of the latex was determined to be 1750 cps at 20 rpm.

EXAMPLE 2

In this experiment, polyethylene glycol was used to reduce the viscosity of SBR latex which was modified with magnesium sulfate. The procedure used in Example 1 was repeated in this experiment except that 0.1 grams of 10 percent aqueous solution of polyethylene glycol (20,000 molecular weight) was added to the latex immediately after the pH was adjusted. This resulted in the latex having a polyethylene glycol content of 0.05 phr and a Brookfield viscosity (RV5) of 320 cps at 20 rpm. This experiment accordingly shows that polyethylene glycol can be used to significantly reduce the viscosity of the divalent metal salt containing latex. More importantly, the latex remained stable and no creaming was observed.

EXAMPLE 3

The procedure employed in Example 2 was repeated in this experiment except that the amount of magnesium sulfate added was increased to 3.6 grams. The latex made in this experiment remained stable and no creaming was observed. It was determined to have a Brookfield viscosity (RV5) at 20 rpm of only 75 cps.

While certain representative embodiments and details have been shown for the purpose of illustrating the subject invention, it will be apparent to those skilled in this art that various changes and modifications can be made therein without departing from the scope of the subject invention.

What is claimed is:

1. A process for coating aggregate which is particularly useful in making asphalt concrete to provide the aggregate with a high level of resistance to stripping by water, which comprises: (1) mixing the aggregate with latex to form a latex/aggregate mixture, wherein said latex is comprised of water, an emulsifier, a polymer and a water-soluble divalent metal salt, wherein said metal salt is a magnesium salt; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

2. A process for coating aggregate which is particularly useful in making asphalt concrete to provide the aggregate with a high level of resistance to stripping by water, which comprises: (1) mixing the aggregate with latex to form a latex/aggregate mixture, wherein said latex is comprised of water, an emulsifier, a polymer and a water-soluble divalent metal salt, wherein said divalent metal salt is calcium chloride; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

3. A process as specified in claim 1 wherein the latex is a polydiene rubber latex.

4. A process as specified in claim 1 wherein the latex is a styrene-butadiene rubber latex.

5. A process as specified in claim 1 wherein the latex is a polybutadiene rubber latex.

6. A process as specified in claim 3 wherein the latex/aggregate mixture prepared in step (1) contains from about 0.01 weight percent to about 0.2 weight percent dry polymer.

7. A process as specified in claim 6 wherein the latex has a solids content which is within the range of about 2 weight percent to about 45 weight percent.

8. A process as specified in claim 7 wherein the latex/aggregate mixture is heated to a temperature which is within the range of about 93° C. to about 204° C.

9. A process as specified in claim 5 wherein the latex/aggregate mixture prepared in step (1) contains from about 0.05 weight percent to about 0.1 weight percent dry polymer.

10. A process as specified in claim 9 wherein the latex has a solids content which is within the range of about 5 weight percent to about 30 weight percent.

11. A process as specified in claim 10 wherein the latex/aggregate mixture is heated to a temperature which is within the range of about 149° C. to about 177° C.

12. A process as specified in claim 11 wherein the latex has a solids content which is within the range of about 10 weight percent to about 20 weight percent.

13. A process as specified in claim 1 wherein the latex contains a sulfonate surfactant.

14. A process as specified in claim 5 wherein the latex contains a disulfonated surfactant.

15. A process as specified in claim 13 wherein the latex/aggregate mixture is heated in step (2) in a drum mixer.

16. A process as specified in claim 2 wherein the coated aggregate is mixed with about 5 weight percent to about 6 weight percent of the asphalt, based upon the total weight of the coated aggregate.

17. The coated aggregate made by the process specified in claim 1.

18. The asphalt concrete made by the process specified in claim 2.

19. A pavement which is made utilizing the asphalt concrete specified in claim 18.

20. The coated aggregate specified in claim 17 wherein the aggregate is coated with from about 0.05 weight percent to about 0.1 weight percent dry polybutadiene polymer, based upon the weight of the aggregate.

21. A process as specified in claim 3 wherein the latex/aggregate mixture prepared in step (1) contains from about 0.005 weight percent to about 0.5 weight percent dry polymer.

22. A process as specified in claim 1 wherein said metal salt is a calcium salt.

23. A process as specified in claim 1 wherein said magnesium salt is magnesium sulfate.

24. A process as specified in claim 1 wherein said magnesium salt is magnesium chloride.

25. A process as specified in claim 1 wherein said metal salt is present in said latex in an amount which is within the range of about 1 phr to about 50 phr.

26. A process as specified in claim 1 wherein said metal salt is present in said latex in an amount which is within the range of about 4 phr to about 30 phr.

27. A process as specified in claim 1 wherein said latex is further comprised of polyethylene glycol.

28. A process as specified in claim 27 wherein said polyethylene glycol is present in an amount which is within the range of about 0.005 phr to about 0.5 phr.

29. A process as specified in claim 27 wherein said polyethylene glycol is present in an amount which is within the range of about 0.01 phr to about 0.1 phr.

30. A process as specified in claim 27 wherein said polyethylene glycol is present in an amount which is within the range of about 0.03 phr to about 0.07 phr.

31. A process as specified in claim 1 wherein said latex has a pH of no more than about 9.

32. A process as specified in claim 1 wherein said latex has a pH of no more than about 8.

33. A process as specified in claim 1 wherein said metal salt is present in said latex in an amount which is within the range of about 5 phr to about 10 phr.

34. A process as specified in claim 2 wherein the latex is a polydiene rubber latex.

35. A process as specified in claim 2 wherein the latex is a styrene-butadiene rubber latex.

36. A process as specified in claim 2 wherein the latex is a polybutadiene rubber latex.

37. A process as specified in claim 34 wherein the latex/aggregate mixture prepared in step (1) contains from about 0.01 weight percent to about 0.2 weight percent dry polymer.

38. A process as specified in claim 37 wherein the latex has a solids content which is within the range of about 2 weight percent to about 45 weight percent.

39. A process as specified in claim 38 wherein the latex/aggregate mixture is heated to a temperature which is within the range of about 93° C. to about 204° C.

40. A process as specified in claim 36 wherein the latex/aggregate mixture prepared in step (1) contains from about 0.05 weight percent to about 0.1 weight percent dry polymer.

41. A process as specified in claim 40 wherein the latex has a solids content which is within the range of about 5 weight percent to about 30 weight percent.

42. A process as specified in claim 41 wherein the latex/aggregate mixture is heated to a temperature which is within the range of about 149° C. to about 177° C.

43. A process as specified in claim 42 wherein the latex has a solids content which is within the range of about 10 weight percent to about 20 weight percent.

44. A process as specified in claim 2 wherein the latex contains a sulfonate surfactant.

45. A process as specified in claim 36 wherein the latex contains a disulfonated surfactant.

46. A process as specified in claim 44 wherein the latex/aggregate mixture is heated in step (2) in a drum mixer.

47. A process as specified in claim 34 wherein the latex/aggregate mixture prepared in step (1) contains from about 0.005 weight percent to about 0.5 weight percent dry polymer.

48. A process as specified in claim 2 wherein said metal salt is present in said latex in an amount which is within the range of about 1 phr to about 50 phr.

49. A process as specified in claim 2 wherein said metal salt is present in said latex in an amount which is within the range of about 4 phr to about 30 phr.

50. A process as specified in claim 2 wherein said latex is further comprised of polyethylene glycol.

51. A process as specified in claim 50 wherein said polyethylene glycol is present in an amount which is within the range of about 0.005 phr to about 0.5 phr.

52. A process as specified in claim 50 wherein said polyethylene glycol is present in an amount which is within the range of about 0.01 phr to about 0.1 phr.

53. A process as specified in claim 50 wherein said polyethylene glycol is present in an amount which is within the range of about 0.03 phr to about 0.07 phr.

54. A process as specified in claim 2 wherein said latex has a pH of no more than about 9.

55. A process as specified in claim 52 wherein said latex has a pH of no more than about 8.

56. A process as specified in claim 35 wherein the styrene-butadiene rubber latex has a bound styrene content of about 20 percent.

57. A process for preparing asphalt concrete which comprises: (1) mixing the aggregate with latex to form a latex/aggregate mixture, wherein said latex is comprised of water, an emulsifier, a polymer and a water-soluble divalent metal salt, wherein the water-soluble divalent metal salt is a magnesium salt; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate; (4) mixing the coated aggregate with about 3 percent to about 8 percent asphalt based upon the total weight of the coated aggregate at a temperature of at least about 107° C.; (5) continuing to mix the coated aggregate with the asphalt to attain an essentially homogeneous asphalt concrete.

58. A process as specified in claim 57 wherein the latex is a polydiene rubber latex.

59. A process as specified in claim 57 wherein the latex is a styrene-butadiene rubber latex.

60. A process as specified in claim 57 wherein the latex is a polybutadiene rubber latex.

61. A process as specified in claim 58 wherein the latex/aggregate mixture prepared in step (1) contains from about 0.01 weight percent to about 0.2 weight percent dry polymer.

62. A process as specified in claim 61 wherein the latex has a solids content which is within the range of about 2 weight percent to about 45 weight percent.

63. A process as specified in claim 62 wherein the latex/aggregate mixture is heated to a temperature which is within the range of about 93° C. to about 204° C.

64. A process as specified in claim 63 wherein the latex/aggregate mixture prepared in step (1) contains from about 0.05 weight percent to about 0.1 weight percent dry polymer.

65. A process as specified in claim 64 wherein the latex has a solids content which is within the range of about 5 weight percent to about 30 weight percent.

66. A process as specified in claim 65 wherein the latex/aggregate mixture is heated to a temperature which is within the range of about 149° C. to about 177° C.

67. A process as specified in claim 66 wherein the latex has a solids content which is within the range of about 10 weight percent to about 20 weight percent.

68. A process as specified in claim 57 wherein the latex contains a sulfonate surfactant.

69. A process as specified in claim 57 wherein the latex contains a disulfonated surfactant.

70. A process as specified in claim 57 wherein the latex/aggregate mixture is heated in step (2) in a drum mixer.

71. A process as specified in claim 57 wherein the latex/aggregate mixture prepared in step (1) contains from about 0.005 weight percent to about 0.5 weight percent dry polymer.

72. A process as specified in claim 57 wherein said magnesium salt is magnesium sulfate.

73. A process as specified in claim 57 wherein said magnesium salt is magnesium chloride.

74. A process as specified in claim 57 wherein said metal salt is present in said latex in an amount which is within the range of about 1 phr to about 50 phr.

75. A process as specified in claim 1 wherein said metal salt is present in said latex in an amount which is within the range of about 4 phr to about 30 phr.

76. A process as specified in claim 57 wherein said latex is further comprised of polyethylene glycol.

77. A process as specified in claim 76 wherein said polyethylene glycol is present in an amount which is within the range of about 0.005 phr to about 0.5 phr.

78. A process as specified in claim 76 wherein said polyethylene glycol is present in an amount which is within the range of about 0.01 phr to about 0.1 phr.

79. A process as specified in claim 76 wherein said polyethylene glycol is present in an amount which is within the range of about 0.03 phr to about 0.07 phr.

80. A process as specified in claim 57 wherein said latex has a pH of no more than about 9.

81. A process as specified in claim 77 wherein said latex has a pH of no more than about 8.

* * * * *